(No Model.)

E. T. GILLILAND.
JUNCTION BETWEEN CABLED AND UNCABLED CONDUCTORS.

No. 327,080. Patented Sept. 29, 1885.

Witnesses.
Geo. Willis Pierce
Wm. B. Vansize

Inventor.
Ezra T. Gilliland

UNITED STATES PATENT OFFICE.

EZRA T. GILLILAND, OF BOSTON, MASSACHUSETTS.

JUNCTION BETWEEN CABLED AND UNCABLED CONDUCTORS.

SPECIFICATION forming part of Letters Patent No. 327,080, dated September 29, 1885.

Application filed July 13, 1885. (No model.)

*To all whom it may concern:*

Be it known that I, EZRA T. GILLILAND, residing at Boston, in the county of Suffolk and State of Massachusetts, have invented certain Improvements in Junctions between Cabled and Uncabled Conductors, of which the following is a specification.

Electrical conductors connecting distant points are frequently composed of cabled conductors and pole-lines, each extending a portion of the distance. My invention is designed to furnish a convenient and ready means for connecting the two classes of conductors together. It is especially applicable for connecting a pole-line of several conductors into an office or station by means of a cable, and I have illustrated and described it in this connection.

I provide an insulator composed of any suitable material—as wood, rubber, glass, or porcelain—having one or more metal bars or posts extending completely through it and projecting a short distance upon each end. A suitable support—as a cross-arm—has perforations to receive these insulators. A longitudinal groove in the arm connects the inner ends of these perforations together, and into this longitudinal groove the inner ends of the metal bars in the insulators project. At the center of the arm is an insulator having one or more holes communicating with this longitudinal groove on the inner end and with a water-tight cable-box upon the outer end. Each of the metal bolts in the insulators are connected by insulated conductors carried along in the longitudinal groove to screw-cups in the cable-box. The end of a divided line-wire is connected to the metal bolt in an insulator, and a cable containing a series of conductors is connected to the screw-cups of the cable-box, thus continuing the circuits of the pole-line through the conductors of the cable.

The work of preparing and combining the cross-arm, insulators, and cable-box is all done at the manufactory, so that the lineman has only to connect the line-wires to the bolts in the insulators and the cable with the screw-posts of the cable-box, each screw-post in the box being marked to correspond with an insulated bolt.

The accompanying drawings illustrate my invention.

Figure 1:
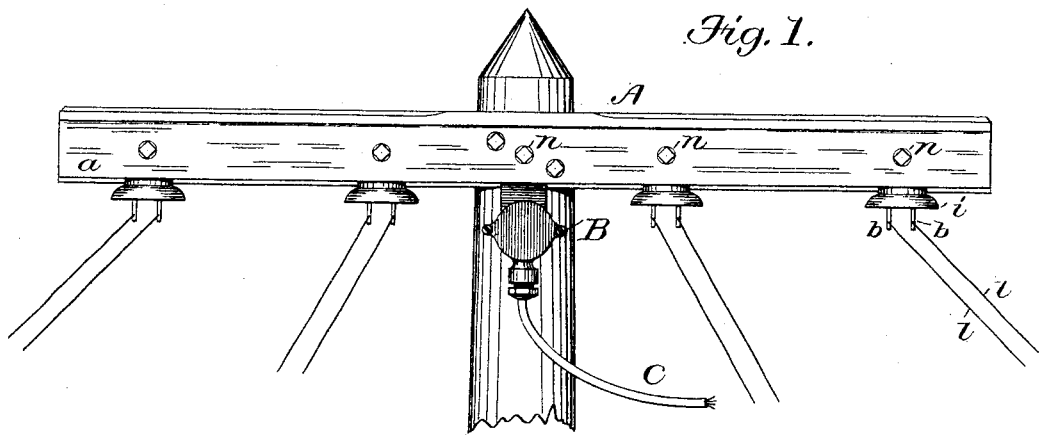
Figure 2:
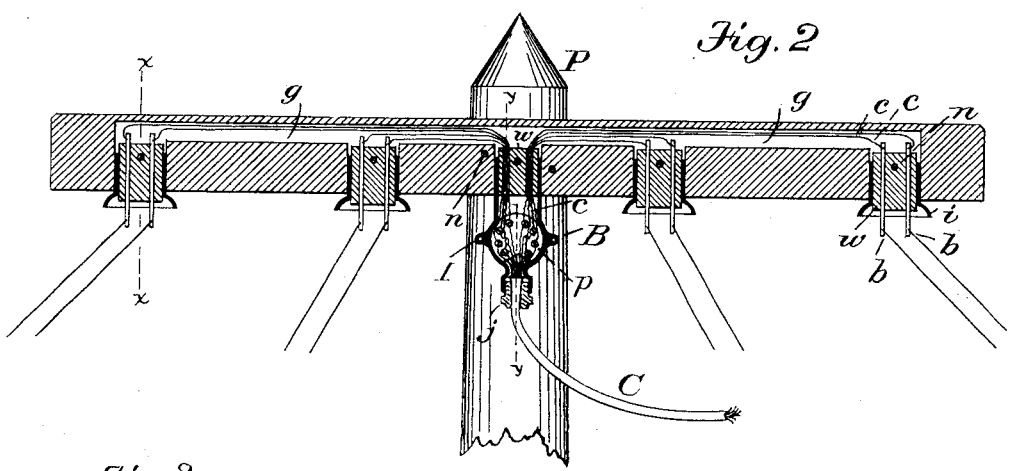
Figure 3:
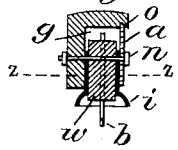
Figure 5:
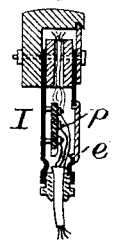
Figure 4:
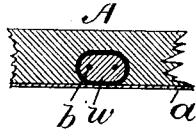

Figure 1 is a view of the junction complete. Fig. 2 is a longitudinal cross-section. Fig. 3 is a cross-section of an insulator on line $x\,x$, Fig. 2. Fig. 4 is a cross-section on line $z\,z$, Fig. 3. Fig. 5 is a cross-section of the cable-box on line $y\,y$, Fig. 2.

A is a cross-arm, preferably of wood, from which a slab, $a$, is cut, leaving an overhanging angular projection, $o$, as in Fig. 3. A longitudinal passage or groove, $g$, is then cut, into which perforations to receive the insulators are cut from the under side of the arm, preferably oval in cross-section, as in Fig. 4. The insulators may be of any suitable material. I prefer to form them of an iron casting, $i$, having a bell-shaped bottom. Into this casting is fitted a core or block of insulating material, $w$, preferably of prepared wood, and in this core are fixed a pair of metal bolts, $b\,b$. These may be of steel, projecting at each end. They have holes or eyes in each end to receive the conductors. There are holes in each insulator to receive the nails or bolts $n$.

I provide a cable-box, B, formed of a casting, I, having a neck shaped like the neck of one of the insulators and of about the same size, in which is fixed a core or block of insulating material, $w$, having one or more holes or passages communicating with passage $g$. The opposite end of the cable-box contains a plate or disk of insulating material, upon which are fixed a series of screw-posts or wire terminals, $p$. Each screw-post or terminal $p$ is connected by a conductor, $c$, to an insulated bolt or terminal, $b$, the conductors $c$ being laid in the groove or passage $g$. At the point where the cable C enters the cable-box there is a packing-box or gland, $j$, to render said box water-tight, and there is a cover, $e$, fitted to the box by a joint having a gasket. After the conductors $c$ are in position the passages are filled with insulating material rendered liquid by heat, and the board or slab $a$ is placed in position and there held by the bolts or nails $n$, which likewise retain the insulators in position.

The arm is placed in position on the pole P. The terminals $p$ and $b$ being correspondingly marked, the lineman has only to connect the terminals of a divided pole-line, $l$, to the bolts $b$, and the corresponding terminals of the cabled conductors to the screw-posts $p$.

If the junction were between single conductors, but one insulated bolt would be necessary for each line-wire.

What I claim, and desire to secure by Letters Patent, is—

1. The herein-described junction between cabled and uncabled conductors, consisting of the combination of a support containing one or more insulated connections, to which the terminal or terminals of the pole-lines are connected, and a cable-box containing a series of wire terminals—as screw-posts—connected to the said insulated connections by conductors laid in a groove or passage in the said insulating-support, and also forming the terminals of the cabled conductors.

2. A cross-arm containing a series of insulators, in each of which is placed one or more metallic bolts to receive the terminals of overhead wires, a cable-box having a series of insulated terminals to receive the cabled conductors, and a groove or passage to receive a series of insulated conductors electrically connecting the said bolts and insulated cable terminals.

3. A cross-arm of wood containing a longitudinal passage and a series of perforations communicating therewith from the under side, in which are fixed one or more insulators, each composed of an iron shell having a core of insulating material, wherein are located a pair of metallic bolts to form the terminals of a divided pole-line conductor, a cable-box composed of a metallic case containing a series of insulated screw-posts communicating with the said longitudinal passage by suitable perforations, and a series of insulated conductors located in the said longitudinal passage and connecting said box terminals and insulated bolts, substantially as described.

4. An insulator composed of an iron shell or casting containing a wooden core, in which are located one or more metallic bolts to receive and hold the conductor.

In testimony whereof I have signed my name to this specification, in the presence of two subscribing witnesses, this 10th day of July, 1885.

EZRA T. GILLILAND.

Witnesses:
 WM. B. VANSIZE,
 GEO. WILLIS PIERCE.